(12) United States Patent
Zhu et al.

(10) Patent No.: US 11,069,894 B2
(45) Date of Patent: Jul. 20, 2021

(54) CROSSLINKED POLYMER BINDERS FOR ELECTROCHEMICAL ENERGY STORAGE DEVICES

(71) Applicants: Yu Zhu, Copley, OH (US); Feng Zou, Akron, OH (US)

(72) Inventors: Yu Zhu, Copley, OH (US); Feng Zou, Akron, OH (US)

(73) Assignee: The University of Akron, Akron, OH (US)

(*) Notice: Subject to any disclaimer, the term of this patent is extended or adjusted under 35 U.S.C. 154(b) by 463 days.

(21) Appl. No.: 15/780,861

(22) PCT Filed: Dec. 5, 2016

(86) PCT No.: PCT/US2016/064924
§ 371 (c)(1),
(2) Date: Jun. 1, 2018

(87) PCT Pub. No.: WO2017/119971
PCT Pub. Date: Jul. 13, 2017

(65) Prior Publication Data
US 2020/0350588 A1 Nov. 5, 2020

Related U.S. Application Data

(60) Provisional application No. 62/262,989, filed on Dec. 4, 2015.

(51) Int. Cl.
*H01M 4/62* (2006.01)
*H01B 1/24* (2006.01)
(Continued)

(52) U.S. Cl.
CPC .............. *H01M 4/622* (2013.01); *H01B 1/24* (2013.01); *H01M 4/139* (2013.01); *H01M 4/625* (2013.01); *H01M 10/0525* (2013.01)

(58) Field of Classification Search
CPC ... H01B 1/00; H01B 1/20; H01B 1/22; H01B 1/24; H01G 11/30; H01M 4/62; H01M 4/86; B05D 5/12
See application file for complete search history.

(56) References Cited

U.S. PATENT DOCUMENTS 4,308,121 A * 12/1981 Hazan ..................... C08F 8/02
204/500
5,206,200 A 4/1993 Bush et al.
(Continued)

FOREIGN PATENT DOCUMENTS

WO  WO 2014/200003 A1 * 12/2014
WO  WO2016129745  8/2016

OTHER PUBLICATIONS

Song et al; Interpenetrated Gel Polymer Binder for High-Performance Silicon Anodes in Lithium-ion Batteries, Advanced Functional Materials, vol. 24, Jul. 19, 2014; pp. 5904-5910.
(Continued)

*Primary Examiner* — Mark Kopec
(74) *Attorney, Agent, or Firm* — Renner Kenner Greive Bobak Taylor & Weber

(57) ABSTRACT

An electrochemical storage device including a conductive material and an electrochemical storage device material held together by a covalently crosslinked binder matrix. A method of forming an electrode for an electrochemical storage device, the method including the steps of: mixing electrochemical storage device material, conductive material, linear polymer, and crosslinker with one or more solvents, the resultant mixture forming an electrode slurry, crosslinking the linear polymer with the crosslinker to thereby create a covalently crosslinked polymer network of the polymer and crosslinker, the crosslinked polymer network physically or chemically binding together the electro-
(Continued)

chemical storage device material and the conductive material.

12 Claims, 4 Drawing Sheets

(51) Int. Cl.
*H01M 4/139* (2010.01)
*H01M 10/0525* (2010.01)

(56) References Cited

U.S. PATENT DOCUMENTS

| | | | |
|---|---|---|---|
| 8,722,230 B2* | 5/2014 | Hwang | C08L 75/04 |
| | | | 429/128 |
| 9,437,875 B2 | 9/2016 | Kim et al. | |
| 2010/0092871 A1* | 4/2010 | Medlege | H01M 4/139 |
| | | | 429/326 |
| 2014/0370383 A1 | 12/2014 | Lim et al. | |
| 2015/0125744 A1* | 5/2015 | Hosaka | H01M 4/386 |
| | | | 429/212 |
| 2015/0357647 A1* | 12/2015 | Kurata | H01M 4/133 |
| | | | 252/182.1 |
| 2016/0164099 A1 | 6/2016 | Wang et al. | |

OTHER PUBLICATIONS

Xue et al; Polysiloxane-Epoxide as Cross-Linkable Binders for Lithium-Ion Batteries, Journal of the Electrochemical Society, vol. 160, issue 10; Aug. 27, 2013; pp. A1819-A1823.
Han et al; Cross-Linked Poly (acrylic acid) with Polycarbodiimide as Advanced Binder for Si/Graphite Composite Negative Electrodes in Li-olon Batteries; ECS Electrochemistry Letters, vol. 2, issue 2, Nov. 29, 2012; pp. A17-A20.
Park et al; A photo-cross-linkable polymeric binder for silicon anodes in lithium ion batteries, RSC Advances, vol. 3, Jul. 1, 2013; pp. 12625-12630.
Koo et al; A Highly Cross-Linked Polymeric Binder for High-Performance Silicon Negative Electrodes in Lithium Ion Batteries, Angewandte Chemie,vol. 51, Jul. 29, 2012; pp. 8762-8767.
Huntsman, Technical Bulletin, Jeffamine ED-2003 Polyetheramine; Copyright 2008; Accessed Aug. 30, 2017.

* cited by examiner

CROSSLINKED POLYMER BINDERS FOR ELECTROCHEMICAL ENERGY STORAGE DEVICES

CROSS-REFERENCE TO RELATED APPLICATIONS

The present application claims priority to U.S. Provisional Patent Application Ser. No. 62/262,989, filed Dec. 4, 2015, the entirety of which is incorporated herein by reference.

STATEMENT REGARDING FEDERALLY SPONSORED RESEARCH OR DEVELOPMENT

This invention was made with government support under contract DE-SC0013831 awarded by the U.S. Department of Energy (DOE). The government has certain rights in the invention.

FIELD OF THE INVENTION

The present invention generally relates to an electrochemical storage device. In some embodiments, the present invention is directed toward an electrochemical storage device comprising a conductive material and an electrochemical storage device material. In some embodiments, the electrochemical storage device of the present invention is held together by a covalently crosslinked binder matrix.

BACKGROUND OF THE INVENTION

Since lithium ion batteries (LIBs) were introduced into the market in 1991, graphite has been employed as the anode material. However, the graphite anode exhibits a theoretical capacity of 372 mAh/g, far short of the requirements as to large-scale applications like electrical vehicles (EVs), where higher energy density and power density are essential. In order to increase the energy density and power density of LIBs, novel anode materials with lower cost and higher capacity are of great need. As one of the most promising emerging anode materials, silicon anodes have attracted much attention due to their higher specific capacities (4200 mAh/g).

However, silicon-based anodes have yet to achieve widespread commercialization due to the large volume change upon lithiation/delithiation, resulting in severe electrode pulverization and degradation. Polymer binder materials are used to improve the adhesion between conductive fillers and active electrode materials. They also play important roles in the silicon anode based cells because they can enhance the adhesion between current collector and electrode materials, mitigating the pulverization. The effect of a binder is especially important when high mass loading of the electrode is needed.

The traditional binder in battery research is polyvinylidene fluoride (PVDF). PVDF was chosen due to several considerations such as the thermal stability, wettability with electrolyte, adhesion to the graphite electrode and good stability under electrochemical environment. However, it was found that PVDF is not an ideal binder for silicon anodes due to the poor adhesion between silicon and the polymer.

Therefore, there is a need in the art for better binding of conductive fillers, such as carbon black, and certain electrochemical storage device materials, such as silicon. There is a need for binder materials with better elasticity to help to mitigate the volume expansion of certain anode or cathode materials.

SUMMARY OF THE INVENTION

In a first embodiment, the present invention provides an electrode for an electrochemical storage device comprising: a conductive material and an electrochemical storage device material held together by a covalently crosslinked binder matrix.

In a second embodiment, the present invention provides an electrode for an electrochemical storage device as in the first embodiment, wherein the conductive material is carbon black, graphite, graphene, carbon nanotube, or other carbonaceous materials.

In a third embodiment, the present invention provides an electrode for an electrochemical storage device as in either the first or second embodiment, wherein the electrochemical storage material is selected from silicon, carbon, tin, antimony, cobalt, iron, lithium nickel manganese cobalt oxide, lithium nickel manganese oxide, lithium manganese oxide, lithium iron phosphate, lithium cobalt oxide, lithium nickel-cobalt-aluminum oxides, sulfur, lithium sulfide, iron fluoride, cupper fluoride, and any combination of above materials.

In a fourth embodiment, the present invention provides an electrode for an electrochemical storage device as in any of the first through third embodiments, wherein the covalently crosslinked binder matrix is a crosslinked network of formed of linear polymer crosslinked with a crosslinker.

In a fifth embodiment, the present invention provides an electrode for an electrochemical storage device as in any of the first through fourth embodiments, wherein the linear polymer includes a polymer backbone and crosslinking reactive groups as side chains off of the polymer backbone.

In a sixth embodiment, the present invention provides an electrode for an electrochemical storage device as in any of the first through fifth embodiments, wherein the crosslinking reactive groups are provided by carboxylic acid groups, amine groups, hydroxyl groups, phosphoric acid groups, amine groups, and thiol groups.

In a seventh embodiment, the present invention provides an electrode for an electrochemical storage device as in any of the first through sixth embodiments, wherein the linear or branched polymer is selected from carboxymethylcellulose (CMC), Polyacrylic acid (PAA), and other polymers with carboxylic acid groups, or amine groups, or hydroxyl groups, or phosphoric acid groups, or thiol groups.

In an eighth embodiment, the present invention provides an electrode for an electrochemical storage device as in any of the first through seventh embodiments, wherein the crosslinker includes crosslinking reactive groups selected from hydroxyl groups, amine groups, phosphoric acid groups or thiol groups.

In a ninth embodiment, the present invention provides an electrode for an electrochemical storage device as in any of the first through eighth embodiments, wherein the crosslinker is telechelic, the crosslinking reactive groups being end groups of the crosslinker.

In a tenth embodiment, the present invention provides an electrode for an electrochemical storage device as in any of the first through ninth embodiments, wherein the crosslinker is

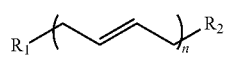

with R=NH2, or OH.

In an eleventh embodiment, the present invention provides an electrode for an electrochemical storage device as in any of the first through tenth embodiments, wherein the ratio of the weight of the polymer to the weight of crosslinker is between 100:1 to 5:1.

In a twelfth embodiment, the present invention provides an electrode for an electrochemical storage device as in any of the first through eleventh embodiments, wherein the crosslinker has a glass transition temperature of less than 50° C.

In a thirteenth embodiment, the present invention provides a method of forming an electrode for an electrochemical storage device as in any of the first through twelfth embodiments, the method comprising the steps of: mixing electrochemical storage device material, conductive material, linear polymer, and crosslinker with one or more solvents, the resultant mixture forming an electrode slurry, crosslinking the polymer with the crosslinker to thereby create a covalently crosslinked polymer network of the linear polymer and crosslinker, the crosslinked polymer network physically or chemically binding together the electrochemical storage device material and the conductive material.

In a fourteenth embodiment, the present invention provides a method of forming an electrode for an electrochemical storage device as in any of the first through thirteenth embodiments, wherein the step of mixing includes the steps of: mixing electrochemical storage device material, conductive material, and polymer in a polymer solvent that dissolves the polymer, the polymer solvent being present in a suitable amount to provide a uniform slurry; mixing the crosslinker with a solvent to create a crosslinker stock solution; and mixing together the uniform slurry and the crosslinker stock solution.

DETAILED DESCRIPTION OF ILLUSTRATIVE EMBODIMENTS

Figure 1:
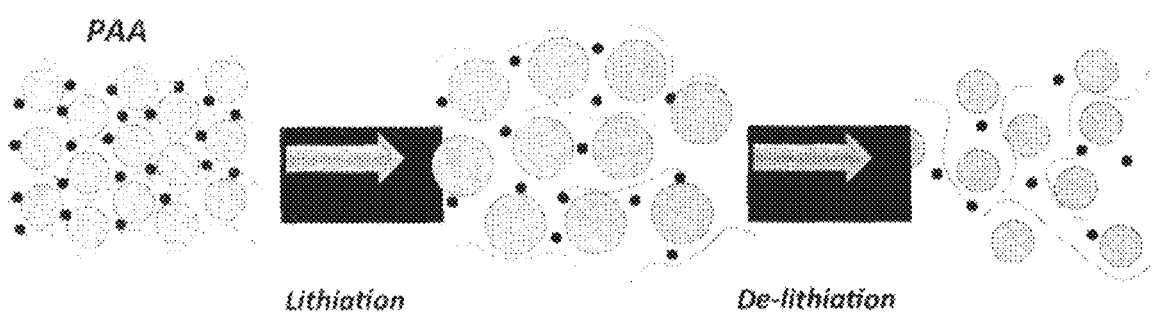
FIG. 1 is a general schematic of the lithiation and delithiation process of a silicon anode in accordance with the current state of the art.

The present invention provides an electrochemical storage device comprising a conductive material and an electrochemical storage device material held together by a covalently crosslinked binder matrix.

In some embodiments, the electrochemical storage material can be selected silicon, carbon, tin, antimony, cobalt, iron and their alloy; NiOx, CoOx, MnOx and other transition metal oxides for anodes, and lithium nickel manganese cobalt oxide, lithium nickel manganese oxide, lithium manganese oxide, lithium iron phosphate, lithium cobalt oxide, lithium nickel-cobalt-aluminum oxides; sulfur, lithium sulfide; iron fluoride, cupper fluoride, and other fluoride for cathodes. Combinations of such electrochemical storage material can also be employed.

In some embodiments, the electrochemical storage material can be selected from silicon nanoparticles. Silicon nanoparticle electrodes of the present invention are preferable and show better performance than electrodes held together by other conventional polymer binders that do not provide a covalently crosslinked binder matrix.

The covalently crosslinked binder matrix can be employed with high mass-loading electrodes. In some embodiments, the covalently crosslinked binder matrix to binder ratio in the active electrode varies from 0% to 30%. In some embodiments, the total mass loading of electrode materials is greater than 1 mg/cm$^2$.

In some embodiments, the conductive material is selected from carbon black, amorphous carbon, graphene, or carbon nanotube and other carbonaceous materials.

In some embodiments, when carbon black is used, the conductive material of the present invention can improve the specific capacity and cyclability as the amount of carbon black is increased.

The conductive material and electrochemical storage device material are held together by a covalently crosslinked binder matrix. The covalently crosslinked binder matrix is a crosslinked network formed of polymer crosslinked with a crosslinker.

Broadly, the polymer may be virtually any linear or branched polymer containing reactive groups provided at side chains off of the polymer backbone. In other embodiments, the reactive groups are provided at the polymer backbone, and in other embodiments, the reactive groups are provided at the end groups. In some embodiments, the reactive groups are selected from carboxylic acid groups, hydroxyl groups, phosphoric acid groups, amine groups, and thiol groups.

In some embodiments, the molecular weight (Mw) of the linear or branched polymer is from 1,000 to 5,000,000 Daltons. In other embodiments, the molecular weight of the linear or branched polymer is from 5,000 to 1,000,000 Daltons, in other embodiments, from 10,000 to 750,000 Daltons, in other embodiments, 25,000 to 750,000 Daltons, in other embodiments, from 50,000 to 600,000 Daltons, and in other embodiments, from 50,000 to 500,000 Daltons.

In some embodiments, the reactive sites are greater than 0% to 100% of monomer units. In other embodiments, the reactive sites are on greater than 5% to less than 95%, in other embodiments, the reactive sites are on greater than 10% to less than 80%, in other embodiments, the reactive sites are on greater than 25% to less than 75%, the reactive sites are on greater than 25% to less than 50%, and in other embodiments, the reactive sites are on greater than 30% to less than 40%.

In some embodiments, the polymer can be hydrophilic. In some embodiments the polymer is a linear hydrophilic polymer. Hydrophilic linear polymers exhibit a strong interaction between the polymer and electrochemical storage device material (i.e. the silicon surface). In such embodiments, when the active material includes a hydrophilic surface, the selected polymer will also be hydrophilic.

In some embodiments, the polymer is selected from carboxymethyl cellulose (CMC), polyacrylic acid (PAA), alginate, polysaccharide, lignin, polyvinyl alcohol, and the lithium salt of those polymers.

In some embodiments, the polymer is CMC, as follows:

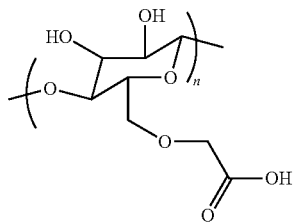

wherein n is greater than 10 to less than 100,000.

In some embodiments, the polymer is PAA, as follows:

wherein n is greater than 10 to less than 100,000.

Broadly, the crosslinker is selected from any low molecular weight polymer or small molecule with crosslinking reactive groups suitable for forming covalent bonds with the reactive groups of the polymer as outlined above (such as amino and hydroxyl groups). The crosslinking reactive groups may be selected from carboxylic acid groups, hydroxyl groups, phosphoric acid groups, amine groups, and thiol groups.

Herein, by "low molecular weight" it is meant a molecular weight of 100,000 Daltons or below.

In some embodiments, when the polymer reactive groups include carboxylic acid groups, the crosslinker contains reactive groups can be selected from hydroxyl groups, amine groups, or thiol groups. In other embodiments, when the polymer reactive groups include hydroxyl groups, the crosslinker reactive groups can be selected from carboxylic acid groups or phosphoric acid groups. In other embodiments, when the polymer reactive groups include phosphoric acid groups, the crosslinker reactive groups can be selected from hydroxyl groups, amine groups, or thiol groups. In some embodiments, when the polymer reactive groups include amine groups, the crosslinker contains reactive groups can be selected from carboxylic acid groups or phosphoric acid groups. In some embodiments, when the polymer reactive groups include thiol groups, the crosslinker contains reactive groups can be selected from carboxylic acid groups or phosphoric acid groups forming an ester.

In some embodiments, when the crosslinker reactive groups include carboxylic acid groups, the polymer contains reactive groups can be selected from hydroxyl groups, amine groups, or thiol groups. In other embodiments, when the crosslinker groups include hydroxyl groups, the polymer reactive groups can be selected from carboxylic acid groups or phosphoric acid groups. In other embodiments, when the crosslinker reactive groups include phosphoric acid groups, the polymer reactive groups can be selected from hydroxyl groups, amine groups, or thiol groups. In some embodiments, when the crosslinker reactive groups include amine groups, the polymer contains reactive groups can be selected from carboxylic acid groups or phosphoric acid groups. In some embodiments, when the crosslinker reactive groups include thiol groups, the polymer contains reactive groups can be selected from carboxylic acid groups or phosphoric acid groups forming an ester.

It will be appreciated that carboxylic acid groups and hydroxyl groups can react through an esterification reaction; carboxylic acid groups and amine groups, and carboxylic acid groups and thiol groups can react through condensation reactions.

In some embodiments, the crosslinker has a molecular weight of less than 500. In other embodiments, the crosslinker has a molecular weight of less than 1,000 Daltons, in other embodiments, less than 5,000 Daltons, and in other embodiments, less than 10,000 Daltons.

In some embodiments, the crosslinker has a molecular weight of greater than 10,000 Daltons. In other embodiments, the crosslinker has a molecular weight of greater than 5,000 Daltons, in other embodiments, greater than 1,000 Daltons, and in other embodiments, greater than 500 Daltons.

In some embodiments, the crosslinker has a molecular weight in the range of 100 to 500 Daltons. In other embodiments, the crosslinker has a molecular weight in the range of 10000 to 50000 Daltons, in other embodiments, in the range of 50000 to 100000 Daltons, and in other embodiments, in the range of 500 to 10000 Daltons.

In some embodiments, the ratio of the weight of the polymer to the weight of crosslinker is greater than 1:1. In some embodiment, the crosslinkers employed in the present invention have a molecular weight that is magnitudes lower than the polymer(s) employed. In other embodiments, the ratio of the weight of the polymer to the weight of crosslinker is greater than 10:1, in other embodiments, greater than 20:1, and in other embodiments, greater than 50:1.

In some embodiments, the ratio of the average molecular weight of the polymer to the weight of crosslinker is greater than 2:1. In some embodiment, the crosslinkers employed in the present invention have an average molecular weight that is magnitudes lower than the polymer(s) employed. In other embodiments, the ratio of the average molecular weight of the polymer to the weight of crosslinker is greater than 10:1, in other embodiments, greater than 20:1, and in other embodiments, greater than 50:1.

In some embodiments, the ratio of the weight of the polymer to the weight of crosslinker is less than 100:1. In other embodiments, the ratio of the weight of the polymer to the weight of crosslinker is less than 50:1, in other embodiments, less than 20:1, and in other embodiments, less than 10:1.

In some embodiments, the ratio of the weight of the polymer to the weight of crosslinker is in the range of about 10:1 to about 1:1. In other embodiments, the ratio of the weight of the polymer to the weight of crosslinker is in the range of about 10:1 to about 20:1, in other embodiments, in the range of about 20:1 to about 50:1, in other embodiments, in the range of about 50:1 to about 70:1, and in other embodiments, in the range of about 70:1 to about 100:1.

In some embodiments the crosslinking reactive groups of the crosslinker are terminal end groups of the crosslinker, i.e., the crosslinker is telechelic.

In some embodiments, the crosslinker is elastic. In such embodiments, the crosslinker has a glass transition temperature that is less than 25° C. In other embodiments, the crosslinker is a conjugated polymer and is conductive.

In some embodiments, the crosslinker segments can be butadiene, siloxane, polyethylene glycol or the above segments with substituted groups. In some embodiments, the crosslinker can be selected from diketopyrrolopyrrole based oligomers.

In some embodiments, the mass ratio of electrochemical storage material to conductive material to crosslinked binder matrix ratio is 6:2:2. In other embodiments, the mass ratio is 4:4:2; in other embodiments, 2:6:2; and in other embodiments, 7:1.5:1.5.

In some embodiments, the crosslinked binder mass ratio in the electrode (including electrochemical storage material, conductive materials and binder) is between 1% to 30%. In other embodiments, the crosslinked binder mass ratio is between 3% to 25%, in other embodiments, between 5% and 25%, in other embodiments, between 10% and 20%, in other embodiments, between 12% and 18%, and in other embodiments, between 14% and 16%.

In some embodiments, the crosslinker is selected according to the following chemical structure:

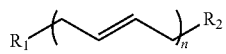

wherein R1 and R2 may be the same or different and are selected from NH2, OH, COOH, PO4H3, SH, and n is less than 1000.

In some embodiments, R1 and R2 are NH2, and n is from 1 to 5000. In other embodiments, where R1 and R2 are NH2, n is from 1 to 3000, in other embodiments, n is from 10 to 2000, in other embodiments, n is from 50 to 1000, in other embodiments, from 100 to 800, and in other embodiments, n is from 100 to 500.

In some embodiments, R1 and R2 are OH, and n is from 1 to 5000. In other embodiments, where R1 and R2 are OH, n is from 1 to 3000, in other embodiments, n is from 10 to 2000, in other embodiments, n is from 50 to 1000, in other embodiments, from 100 to 800, and in other embodiments, n is from 100 to 500.

A method of forming the electrochemical storage device of the present invention includes mixing electrochemical storage device material, conductive material, polymer, and crosslinker (all as disclosed above) with one or more solvents, the resultant mixture forming an electrode slurry. Thereafter, crosslinking is initiated so the linear polymer is crosslinked with the crosslinker to thereby create a covalently crosslinked polymer network of the linear polymer and crosslinker, the crosslinked polymer network physically or chemically binding together the electrochemical storage device material and the conductive material.

In some embodiments, the polymer selected, such as CMC or PAA, will bind with the active material through non-covalent forces. In such embodiments, the non-covalent forces include Van der Waals, hydrogen bonding, or coordination bonding.

In some embodiments, the mixing step includes first mixing electrochemical storage device material, conductive material, and polymer in a polymer solvent that dissolves the polymer, the polymer solvent being present in a suitable amount to provide a uniform slurry. Thereafter, the crosslinker is added and mixed to create the electrode slurry (as named above), and the crosslinking reaction initiated. In some embodiments, the crosslinker is added by first mixing the crosslinker with a solvent to create a crosslinker stock solution, which is then added to the uniform slurry, and crosslinking is then initiated. In some embodiments, crosslinking may be initiated by photo initiation or heat initiation.

In some embodiments, the polymer solvent is selected from N-metyl-2-pyrrolidone (NMP), dimethyl formamide (DMF), water, Tetrahydrofuram (THF) or any combination of them. The solvent is employed to facilitate processing and mixing.

In some embodiments, to facilitate mixing, the electrochemical storage device material and conductive material are pulverulent. In some embodiments, the pulverulent electrochemical storage device material has a mean particle size of less than 100 micrometers in its largest dimension. In some embodiments, the pulverulent conductive material has a mean particle size of less than 1 micrometers in its largest dimension.

Notably, the crosslinked binder matrix increases the stability of the anode upon cycling. For example, as shown in FIG. 1, the current state of the prior art employs hydrophilic linear polymers, silicon particles and carbon black. During the lithiation and delithiation process, the linear polymer is easily broken into pieces due to the severe volume expansion of the silicon. Once volume expansion occurs, the electrochemical storage device will exhibit relatively weak interactions between the linear polymer molecules and the surface of the silicon, which will decrease the stability of the anode.

Figure 2:
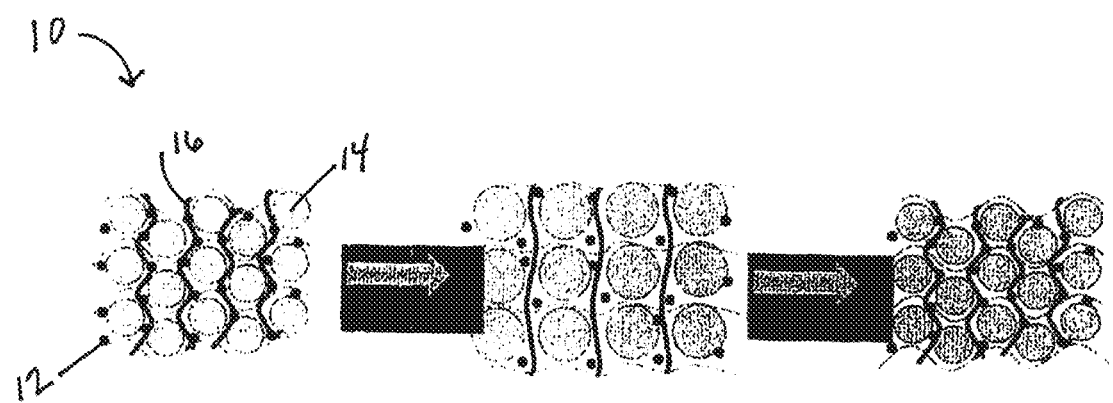
FIG. 2 is general schematic of an electrode for an electrochemical storage device including a covalently crosslinked binder matrix.
Figure 3:
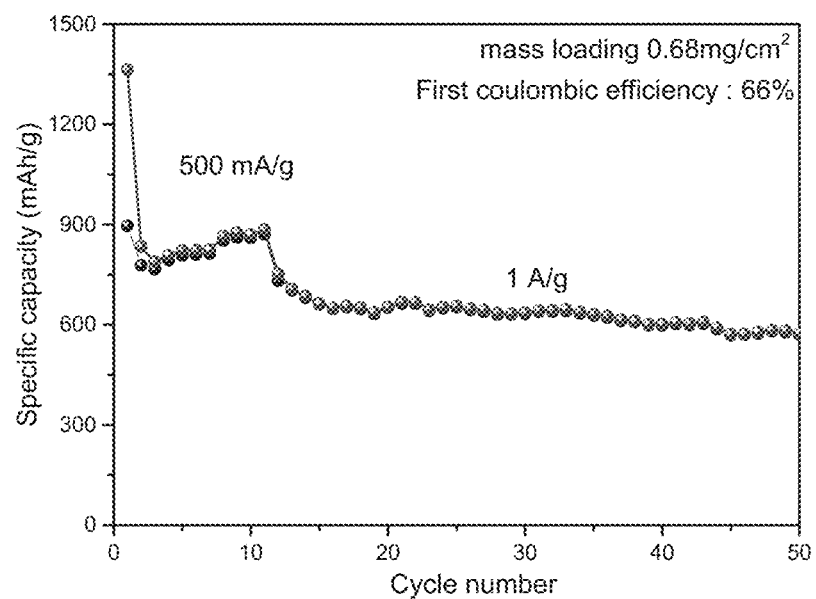
FIG. 3 depicts the results of an electrode for an electrochemical storage device including PEO (poly propylene oxide) diamine terminated (Mw 2000) as a cross-linker.
Figure 4:
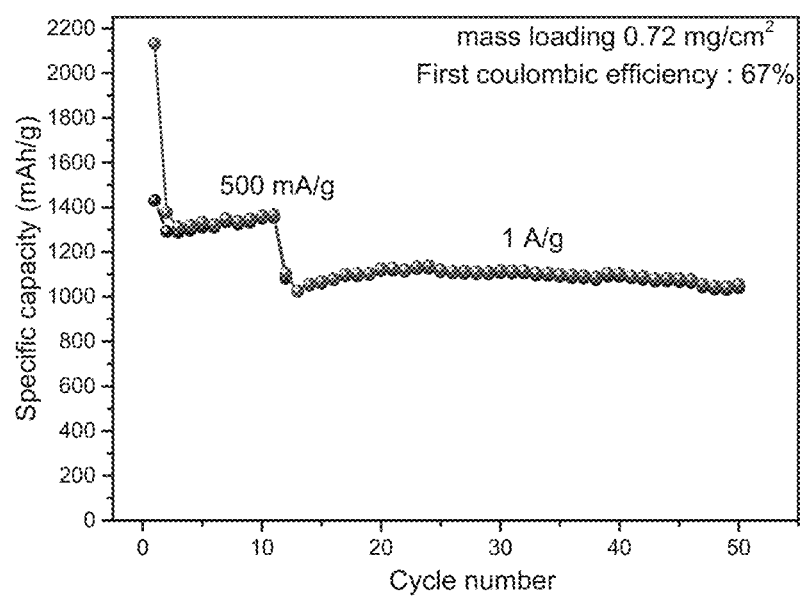
FIG. 4 depicts the results of an electrode for an electrochemical storage device including PBD (poly butadiene diol) (Mw 1200) as a cross-linker in accordance with the present invention.

However, as shown in FIG. 2, the electrochemical storage device 10 comprises a conductive material 12, an electrochemical storage device material 14, and a covalently crosslinked binder matrix 16. The covalently crosslinked binder matrix 16 is utilized to form a solid network. During the lithiation and delithiation process, the covalently crosslinked binder matrix 16 retains the structure of the electrochemical storage device 10. After crosslinking, the crosslinked binder matrix 16 forms a solid network, which can survive the volume expansion of the electrochemical storage device material 14.

In some embodiments, the crosslinked binder matrix has a low glass transition temperature, thereby enhancing flexibility of the crosslinked binder matrix. In some embodiments, crosslinked binder matrix has a glass transition temperature of less than 100° C., in other embodiments, less than 20° C.

The present invention is useful in the creation of electrochemical energy storage systems. Examples of electrical energy storage systems include, but are not limited to, lithium ion batteries, sodium ion batteries, lithium sulfur batteries, sodium sulfur batteries, and supercapacitors.

The electrochemical energy storage device of the present invention is cost-effective and, per particular embodiments, can include low cost raw materials such as sodium and sulfur. The covalently crosslinked binder matrix is employed to prepare an electrochemical storage devices with good capacity and cyclability.

In some embodiments, the electrochemical storage device of the present invention includes a target cycle performance of about 100 to about 5000 cycles. In some embodiments, the target cycle performance is about 250 to about 4000 cycles, in other embodiments, from about 500 to about 3000 cycles, in other embodiments, from about 750 to about 2000 cycles, and in other embodiments, from about 1000 to about 1500 cycles. 100711 In some embodiments, the electrochemical storage device of the present invention employs a target mass loading of the electrode of greater than 1 mg/cm$^2$ and less than 50 mg/cm$^2$. In some embodiments, the target mass loading of the electrode is greater than 2 mg/cm$^2$ and less than 40 mg/cm$^2$, in other embodiments, greater than 2 mg/cm$^2$ and less than 30 mg/cm$^2$, in other embodiments, greater than 5 mg/cm² and less than 25 mg/cm², and in other embodiments, greater than 5 mg/cm² and less than 20 mg/cm².

In a specific embodiment, the electrode for an electrochemical storage device includes a PEO (poly propylene oxide) diamine terminated (Mw 2000) as a cross-linker.

In another specific embodiments, the electrode for an electrochemical storage device includes a PBD (poly butadiene diol) (Mw 1200) as a cross-linker.

In light of the foregoing, it should be appreciated that the present invention significantly advances the art by providing an electrochemical storage device that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLES

The cross-linked (Poly acrylic acid) (PAA) binder was synthesized via a thermal induced crosslinking reaction. Polyethylene glycol with terminal hydroxyl group was used as crosslinker. In a typical synthesis, N-methy-l-2-pyrrolidone (NMP) solution of PAA was mixed with (tetrahydrofuran) THF solution of cross-linker in a mass ratio of 1:1 to 20:1 to produce a binder precursor for the electrode. After mixing with active materials and carbon black, the slurry was casted on a copper foil with a doctor blade and heated at 100° C. in vacuum for overnight. The formation of the ester group can be confirmed by FTIR characterization. The electrode was cut into ~1 cm² circles and used in the lithium ion battery half cell. The half cell counter electrode is lithium metal. The electrolyte is ethylene carbonate and diethyl carbonate with 1 M lithium hexafluorophosphate. The battery was prepared in the argon filled glove box and sealed in a coin cell case. The cell was tested at room temperature.

What is claimed is:

1. An electrode for an electrochemical storage device comprising:
a conductive material and an electrochemical energy storage material held together by a covalently crosslinked polymer binder matrix wherein the covalently crosslinked polymer binder matrix is a crosslinked network formed of linear polymer crosslinked with a crosslinker having a glass transition temperature of less than 50° C. and wherein the linear polymer is selected from carboxymethylcellulose (CMC) and Polyacrylic acid (PAA).

2. The electrode of claim 1, wherein said conductive material is carbon black, graphene, carbon nanotube, or other carbonaceous materials.

3. The electrode of claim 1, wherein said electrochemical energy storage material is selected from silicon, carbon, tin, antimony, cobalt, iron, lithium nickel manganese cobalt oxide, lithium nickel manganese oxide, lithium manganese oxide, lithium iron phosphate, lithium cobalt oxide, lithium nickel-cobalt-aluminum oxides, sulfur, lithium sulfide, iron fluoride, cupper fluoride, and any combination of above materials.

4. The electrode of claim 1, wherein the linear polymer includes a polymer backbone and crosslinking reactive groups as side chains off of the polymer backbone.

5. The electrode of claim 4, where said crosslinking reactive groups are provided by carboxylic acid groups, amine groups, hydroxyl groups, phosphoric acid groups, amine groups, and thiol groups.

6. The electrode of claim 4, wherein said crosslinker is telechelic, said crosslinking reactive groups being end groups of the crosslinker.

7. The electrode of claim 4 wherein said crosslinker includes crosslinking reactive groups selected from hydroxyl groups, amine groups, phosphoric acid groups or thiol groups.

8. The electrode of claim 1 wherein said crosslinker is

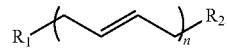

with R=NH2, or OH.

9. The electrode of claim 1, wherein the ratio of the weight of the polymer to the weight of crosslinker is between 100:1 to 5:1.

10. The electrode of claim 1, wherein crosslinker has a glass transition temperature of less than 25° C.

11. A method of forming an electrode of claim 1 for an electrochemical storage device, the method comprising the steps of:
mixing electrochemical energy storage material, conductive material, linear polymer, and crosslinker with one or more solvents, the resultant mixture forming an electrode slurry, crosslinking the polymer with the crosslinker to thereby create a covalently crosslinked polymer network formed of the linear polymer crosslinked with the crosslinker, the crosslinked polymer network physically or chemically binding together the electrochemical energy storage material and the conductive material, crosslinker having a glass transition temperature of less than 50° C. and wherein the linear polymer is selected from carboxymethylcellulose (CMC) and Polyacrylic acid (PAA).

12. The method as in claim 11, wherein said step of mixing includes the steps of:
mixing the electrochemical energy storage material, the conductive material, and the polymer in a polymer solvent that dissolves the polymer, the polymer solvent being present in a suitable amount to provide a uniform slurry;
mixing the crosslinker with a solvent to create a crosslinker stock solution; and
mixing together the uniform slurry and the crosslinker stock solution.

* * * * *